PATENTED MAR 14 1972 3,648,548

PATENTED MAR 14 1972　　3,648,549

INVENTOR.
EARL D. SIDDALL
BY
ATTORNEY

INTERNALLY DRIVEN STOP NUT

This invention relates to a locknut which can be internally driven.

A locknut of the type having a relieved bottom section, a continuous, unbroken outer peripheral wall, a central threaded sleeve for receiving a bolt, and structural bracing fins extending from the top of the polygonal wall toward the central axis of the nut is disclosed in U.S. Pat. No. 2,758,627, issued to Randall on Aug. 14, 1956. This type of lock nut has been found particularly useful in applications where vibration and high temperatures must be withstood, and where lightness of weight is at a premium.

This type of locknut has heretofore been limited to applications where it could be set by external wrenching, because there was no provision for internal wrenching. Therefore, it was limited to applications where there was sufficient clearance around the nut so that it could be tightened down by application of a wrench to the outer polygonal wall. In many cases, it is desired to set a locknut of this type in a sink which closely conforms to the shape of the nut and which does not leave room for external wrenching. Therefore, it is desirable to provide means for internal wrenching of the general type of nut shown in the aforesaid Randall patent.

According to this invention, a locknut of the type having a continuous unbroken peripheral wall, a relieved bottom, a central tubular sleeve attached to the relieved bottom, and structural bracing fins which are integral with the peripheral wall and extend away from the bottom section and toward the central axis of the nut, is provided with sufficient spacing between the fins to admit the tines of a wrench. The tines are preferably equal in number to the number of fins, and are of such lateral dimensions that they make contact with and engage the said structural bracing fins.

According to a preferred but optional feature of this invention, the edges of the structural bracing fins lie in planes which are parallel to the central axis of the nut, and the faces of the tines are planes which are parallel to the central axis of the wrench so that the face of the tines and the edges of the structural bracing fins make full surface contact with each other when the nut is tightened down.

According to still another preferred but optional feature of the invention, the wrench is provided with an axial bore between and behind the tines so that a bolt onto which the nut is threaded can reach into the wrench. This enables a wrench with short tines of maximum strength to be used to tighten a nut onto a bolt. The length by which the bolt protrudes through the nut is rendered immaterial by this hole.

Figure 1:
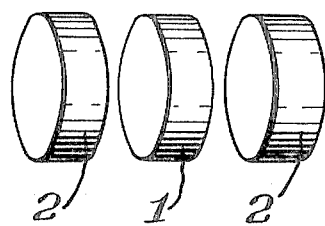
Figure 2:
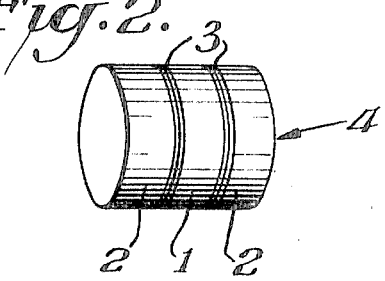
Figure 3:
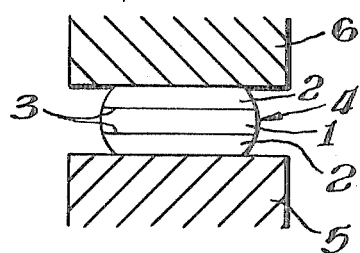
Figure 4:
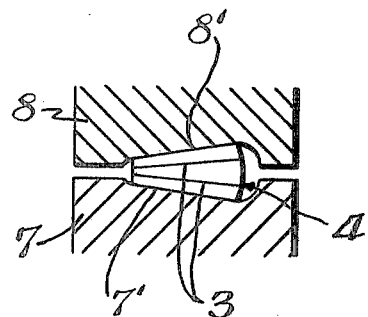
Figure 5:
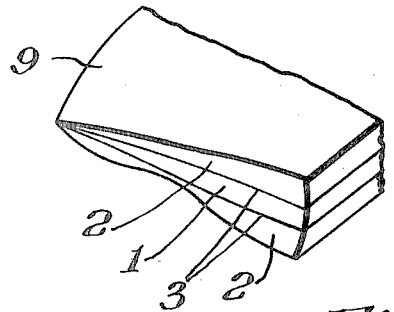
Figure 6:
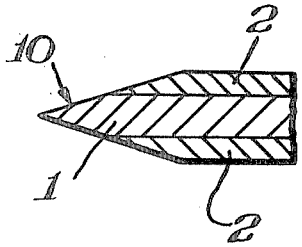
Figure 1:
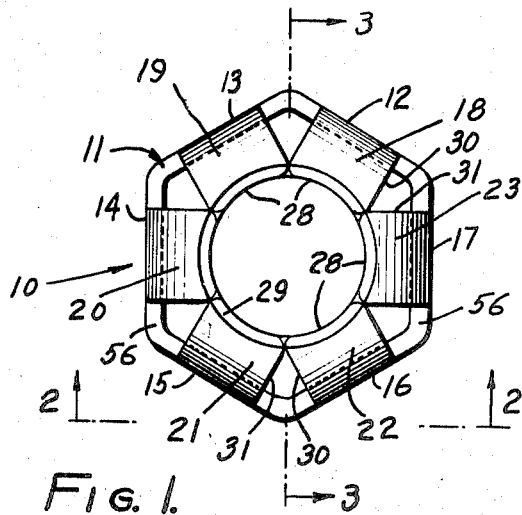
Figure 3:
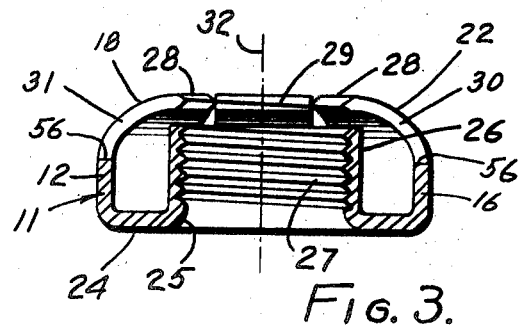
Figure 2:
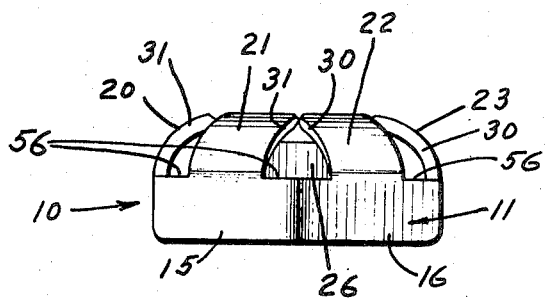
Figure 5:
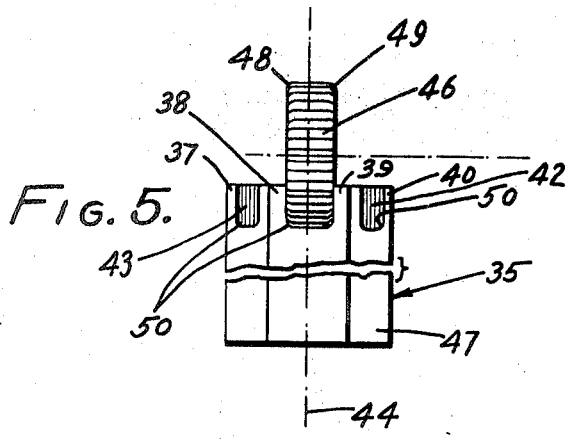
Figure 4:
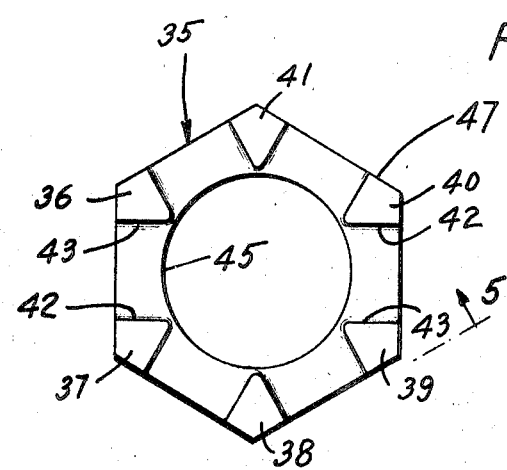
Figure 6:
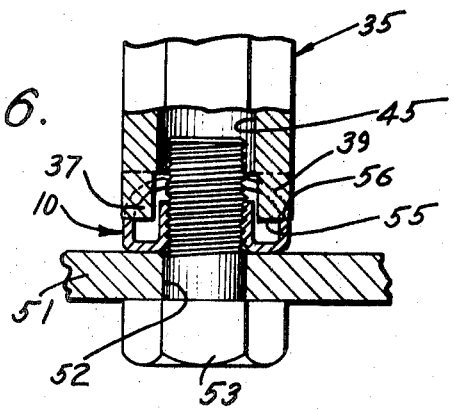

The above and other features of this invention will be fully understood from the following detailed description and the accompanying drawings, of which:

FIG. 1 is a plan view of a locknut according to the invention;
FIG. 2 is a side elevation taken at line 2—2 of FIG. 1;
FIG. 3 is a cross section taken at line 3—3 of FIG. 1;
FIG. 4 is an end view of a wrench according to the invention;
FIG. 5 is a side elevation taken at line 5—5 of FIG. 4 showing parts of the wrench being manufactured; and
FIG. 6 is a side elevation partly in cutaway cross section showing a locknut of FIG. 1 being installed by the wrench of FIG. 4.

A locknut 10 according to the invention is shown in FIG. 1. This locknut has a continuous unbroken peripheral wall 11. In the preferred embodiment of the invention, the wall is polygonal, preferably being a regular polygon of six sides so that common wrenches can be used on it. The hexagonal wall provides six faces 12-17 which can be engaged by the wrench. At the top of each of these faces 12-17, and integral with the said wall there is a plurality of structural bracing fins 18-23, respectively. There is preferably one fin for each face, although it will be recognized that more or fewer of these fins could be provided. Preferably, the fins are spaced uniformly around the axis so as to exert a balanced force on a bolt threaded through the nut.

As best shown in FIG. 3, the peripheral wall 11 is integral with a central bottom portion 24. The bottom portion is the lowermost part of the nut. As shown, the greater part of the area of the bottom portion 24 can be a flat annular disc, but the central part of the bottom portion is relieved by a relief 25. The term "relief" means that the inner portion of the bottommost surface of the nut is not flat and planar over its entire extent. Instead, at the relief there is a curve so that the bottom surface rises away from a flat plane which is perpendicular to the central axis of the nut at the central part of the bottom. A central tubular sleeve 26 is integral with the bottom portion, and has internal threads 27 therein.

The internal tips 28 of the structural bracing fins form an opening which is preferably no larger than the opening in the tubular sleeve. A thread 29 is cut on the inner end of the tips 28.

In the manufacture of this nut it is the practice to start out with a flat blank of metal having flat fingers which are to become the structural bracing fins. This blank is upset at the center and edges to form a central sleeve and the upstanding peripheral wall. The fins extend vertically at this time. Thereafter, the structural bracing fins are forced downwardly and inwardly by a conical die, and the threads 27 and 29 are simultaneously tapped.

With this arrangement, and assuming a lack of springback in the structural bracing fins, the opening at the tips 28 of the structural bracing fins is exactly the same size as the hole in the central sleeve, and the threads 27 and 29 are in phase; that is, a bolt threaded into and through the central sleeve would smoothly thread along the fins without drag. Occasionally it is desired to have an installation torque, in which case, after the threads 27 and 29 have been tapped, the structural bracing fins may be pressed down slightly so as to throw the threads 29 out of phase with threads 26 by about 5° to 10°, and at the same time reduce the size of the opening at tips 28 to a size somewhat less than that of the opening in the central sleeve 27. A downward movement of the tip ends of a few thousandths of an inch is sufficient for this purpose. The drag results from springback of the tips of the fins as they bear against the bolt.

As best seen in FIGS. 1 and 2, the structural bracing fins are substantially spaced apart from each other at their bases, and closely approach each other at the tips. The tips have a curved plan configuration that conforms to the surface of a bolt which is threaded therethrough. An opening is formed between the fins which is generally wedge shaped, and the side edges 30,31 of the fins are planes that are parallel to the central axis 32 of the nut.

A wrench 35 for use in driving the nut of FIG. 1 is shown in FIG. 4. This wrench may conveniently be made from a length of hexagonal bar stock, or from bar stock having an outer contour similar to that of the nut to be installed by it. The wrench can, of course, have more or fewer sides than the nut, but generally the most convenient wrench will be that which has its outer dimensions commensurate with the outer dimensions of the peripheral wall of the nut. The wrench illustrated has six tines 36–41. The tines are wedge shaped, and have lateral dimensions which correspond to the lateral dimensions of the spacings between adjacent fins of the nut. The side edges 42, 43 of each of the tines are parallel to the central axis 44 of the wrench. Preferably the edges of the fins and the walls of the tines which engage each other make equal angles with respect to any line in the plane of FIG. 1. This provides for a substantial surface contact between the wrench and the nut.

A hole 45 is bored axially into the end of the wrench between the tines so as to pass a bolt on which the nut is being tightened. The hole enables the tines to be made just long enough to engage the nut. The wrench, and tines of only minimum length, need be provided. Long tines would tend to break easily. The bolt can enter the hole, so that its length is immaterial.

The method of manufacturing wrench 35 is shown in FIG. 5. A milling cutter 46 is moved across the end of the bar stock 47 in three passes which are 60° from each other. The edges 48, 49 of the mill are rounded so as to leave fillets 50 at the base of the tines. This makes for a stronger tine. The hole 45 is bored between the tines.

FIG. 6 illustrates the nut of FIG. 1 being tightened down by the wrench of FIG. 4. As can be seen, a plate 51 has a hole 52 therein, which passes a headed bolt 53. A nut 10 is being tightened onto the bolt 53 by a wrench 35. The tines of the wrench are placed between adjacent fins so that the side edges 48, 49 of the tines are in contact with the edges 30, 31 of the fins, with the ends of the tines resting atop the peripheral wall of the nut. The ends 55 of the tines and the top edges 56 of the wall between the fins are preferably planar, and substantially perpendicular to the central axis of the wrench and nut, respectively.

The details of operation of this type of locknut are disclosed fully in the above-identified Randall patent, so that only a brief resume will be given here. If the threads on the structural bracing fins are in phase with the threads in the central sleeve, the locknut can be freely spun onto the bolt until it rests against plate 51. If the threads on the structural bracing fins are slightly out of phase, then there will be a small drag to be overcome in tightening down the nut. In either event, when the nut first strikes the plate, an area of the bottom portion outward from the center of the bottom section will be the first part of the nut to meet the plate. Further tightening develops considerable pressure between the first contact area and the plate, but because of the relief at the center, the central sleeve is able to move a further distance along the bolt. This causes upward forces to be developed in the peripheral wall. The forces are upward instead of outward, because the peripheral wall cannot spread apart due to its integral continuous nature. The fins are drawn toward each other by the forces in the wall. It has been found that in a one-fourth inch nut of this type, the fins, if free, move in enough to diminish the opening at their tips by about 0.007 inch. The result of this is that the more that the nut is tightened down, the more the structural bracing fins bear against the bolt and the tighter the nut is held. This tight retention of the nut is maintained until the nut is loosened enough to free the bottom portion from contact with the plate.

This invention enables locknuts of the Randall type to be tightened down by internal wrenching. Both the wrench and the nut are easy to manufacture, and each can be made of a single piece of material.

This invention is not to be limited to the embodiments shown in the drawings and described in the description which are given by way of example and not of limitation, but only in accordance with the scope of the appended claims.

I claim:

1. In combination, a locknut having a central axis, a bottom portion at the bottom of the nut which extends generally transverse to the central axis and has a relief at the innermost part of its lower surface and which has a hole therethrough, a central internally threaded sleeve integral with the bottom portion on the opposite side thereof from the relief, and joining the bottom portion at the hole therethrough, said sleeve having a hole therethrough which registers with the hole in the bottom portion, a continuous unbroken solid peripheral wall integral with the bottom portion at its edge farthest from the central axis and on the same side of the bottom portion as said sleeve, and a plurality of evenly structural bracing fins integral with the peripheral wall and removed from the bottom portion, said structural fins extending away from the bottom portion and toward the said central axis, said fins having a side edges and tips, and being spaced from each other, so as to leave a spacing between side edges of adjacent fins, which spacing is wedge shaped in plan view and a wrench for internally driving the said locknut comprising a bar, and tines equal in number to said spacings projecting from the bar, each of which has a pair of side edges forming a wedge shape in cross section which is substantially geometrically congruent to the shape of the spacing in plan view, said side edges being engageable with the side edges of said fins for driving the nut, said side edges being planar and parallel to the central axis.

* * * * *